United States Patent [19]
Johnson

[11] Patent Number: 4,550,609
[45] Date of Patent: Nov. 5, 1985

[54] ACOUSTIC LENS

[75] Inventor: Nicholas D. Johnson, London, England

[73] Assignee: National Research Development Corp., London, England

[21] Appl. No.: 532,913

[22] Filed: Sep. 16, 1983

[30] Foreign Application Priority Data

Sep. 23, 1982 [GB] United Kingdom ................. 8227166

[51] Int. Cl.[4] ............................................ G01N 29/04
[52] U.S. Cl. ........................................ 73/642; 181/176
[58] Field of Search ................. 73/642, 644, 606, 607; 367/150, 151; 181/176; 310/335

[56] References Cited

U.S. PATENT DOCUMENTS

| | | | |
|---|---|---|---|
| 965,326 | 7/1910 | Prescott | 181/176 |
| 2,033,337 | 3/1936 | Harmer | 181/176 |
| 3,262,307 | 7/1966 | Hart | 73/642 |
| 3,269,173 | 8/1966 | Ardenne | 73/642 |
| 3,379,902 | 4/1968 | Harris et al. | 73/642 |
| 3,895,188 | 7/1975 | Ingraham | 367/151 |
| 3,927,557 | 12/1975 | Viertl | 73/607 |
| 3,965,455 | 6/1976 | Hurwitz | 367/151 |
| 4,435,985 | 3/1984 | Wickramasinghe | 73/642 |

*Primary Examiner*—Anthony V. Ciarlante
*Attorney, Agent, or Firm*—Cushman, Darby & Cushman

[57] ABSTRACT

A device for focussing or collimating a beam of acoustic radiation comprises a body of acoustically transmissive material having first endface (12) coupled to a source of acoustic radiation (16, 18). The radiation is internally reflected by the side surface 20 of the body, this surface being of a shape such that it brings the radiation to a focus F after transmission through a second surface (14).

13 Claims, 4 Drawing Figures

ACOUSTIC LENS

This invention relates to a device for focusing or collimating a beam of acoustic radiation, and a major use will be in acoustic microscopes.

A scanning acoustic microscope is described by R. A. Lemons and C. F. Quate in the 1973 Ultrasonics Symposium Proceedings of the Institute of Electrical and Electronic Engineers Cat. No. CHO 807-8SU. An acoustic plane wave is focused by passage through a concave face in a sapphire crystal into a water cell which couples the focused wave to an object. Transmitted radiation is received by a similar sapphire crystal and recollimated.

At the high frequencies essential for good resolution, the attentuation of sound in water is very high so that only a short path length in water can be tolerated. The focal length of the curved surface must therefore be short, so the curvature of the concave face must be very small, and manufacture of the lens is difficult. An acoustic lens according to the present invention does not require a concave focusing face of very short radius and the absence of this requirement allows use at higher acoustic frequences than is possible with known lenses.

According to the invention, there is provided apparatus for focussing or collimating a beam of acoustic radiation comprising a body of material capable of transmitting acoustic radiation and having a first surface with an electro-acoustic transducer coupled thereto, a second surface remote from said first surface for propagation of acoustic radiation between said body and an acoustic transmission medium in contact with said second surface and a third surface co-operable with said first surface to focus said acoustic radiation externally to said body and beyond said second surface.

In one embodiment the first endface is plane and parallel to the second endface and the sides of the body are curved; the sides are usually approximately parabolic in shape, a slight difference from the precise mathematical form being required when the velocity of sound in the lens is different from the velocity of sound in a coupling liquid in contact with the second endface.

In a second embodiment, the first endface is generally concave and has an outer annulus of frusto-conical form and the sides of the body between the endfaces are also frusto-conical; the transducer is in contact with said outer annulus of the first endface. It is an advantage of this embodiment that it has a considerable depth of focus.

In a third embodiment, the first endface is generally convex and is of smaller area than the second endface, and the sides of the body between the endfaces are frusto-conical, the cone angle of the part adjacent the first endface being smaller than the cone angle of the part adjacent the second endface. The third embodiment also has a considerable depth of focus.

Usually the lens body will be of circular cross section parallel to the second endface, but other sections, for example a square cross section, may be used in some circumstances.

An acoustic lens according to the invention can either be used as an acoustic transmitter, when an alternating electrical signal is applied to the electro-acoustic transducer, and a convergent acoustic signal is emitted through the second endface, or the lens can be used as an acoustic receiver, when a divergent signal received through the second endface will be collimated, will be incident on the electro-acoustic transducer as a plane acoustic wave, and converted to an a.c. electrical signal. In a scanning acoustic mircoscope, two acoustic lenses according to the invention will be arranged with their second endfaces adjacent and spaced so as to be confocal and there will also be provided means for causing relative movement in the focal plane between an object and the position of the focus. In use the lenses are coupled to the object by a layer of coupling liquid.

The invention will now be described by way of example only with reference to the accompanying drawings in which.

Figure 1:
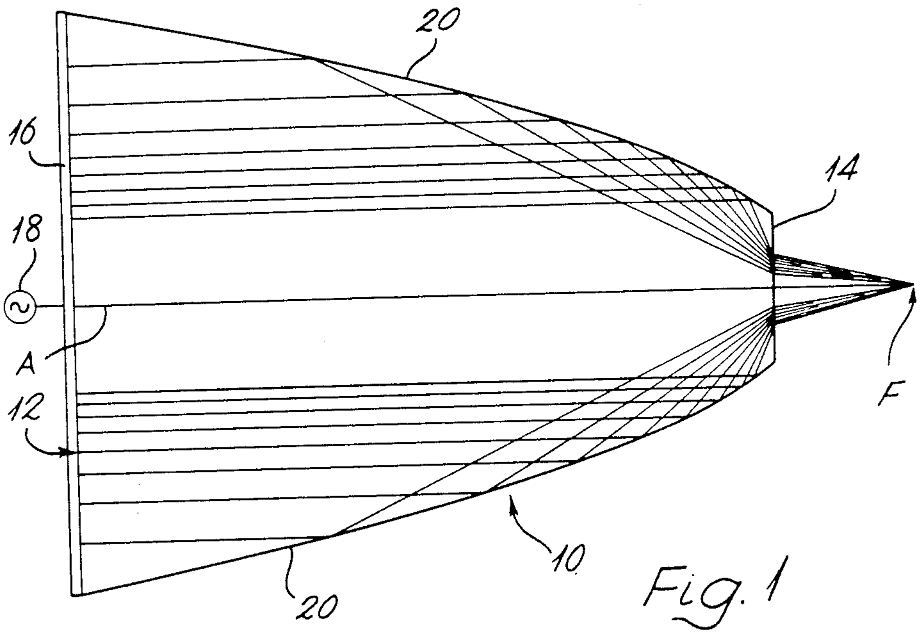
FIG. 1 is a longitudinal section through a first embodiment of an acoustic lens according to the invention, with ray tracing to illustrate the focusing effect on acoustic radiation.

In FIG. 1, an acoustic lens 10 according to the invention comprises a solid body having first and second plane, parallel endfaces 12, 14. The first endface carries a plane piezoelectric transducer 16 connected to a high frequency source 18. The lens is symmetrical about an axis A perpendicular to the endfaces 12, 14, and the lens wall 20 between the endfaces is approximately parabolic in shape, the apex of the parabola lying beyond the second endface 14.

In the Figure, several ray paths are shown, all rays being internally reflected once by the curved wall 20. The rays meet at a focus F beyond the second endface 14. The distance of the focus from the endface is exaggerated. The focus will lie in a coupling liquid, usually water, so there is a change in acoustic refractive index at the endface 14. To find the precise shape of the lens wall 20, the rays are traced backwards from the focus in accordance with the index difference between the coupling liquid round the focus and the material of the lens 10, and a calculation is made of the locus of reflection points required to give parallel rays at the first endface 12, the rays also having equal times of flight; this gives the shape of the lens wall 20.

Typically lens materials are aluminium, fused quartz or sapphire, or a high polymeric material such as polyethylene or polymethylmethacrylate.

Figure 2:
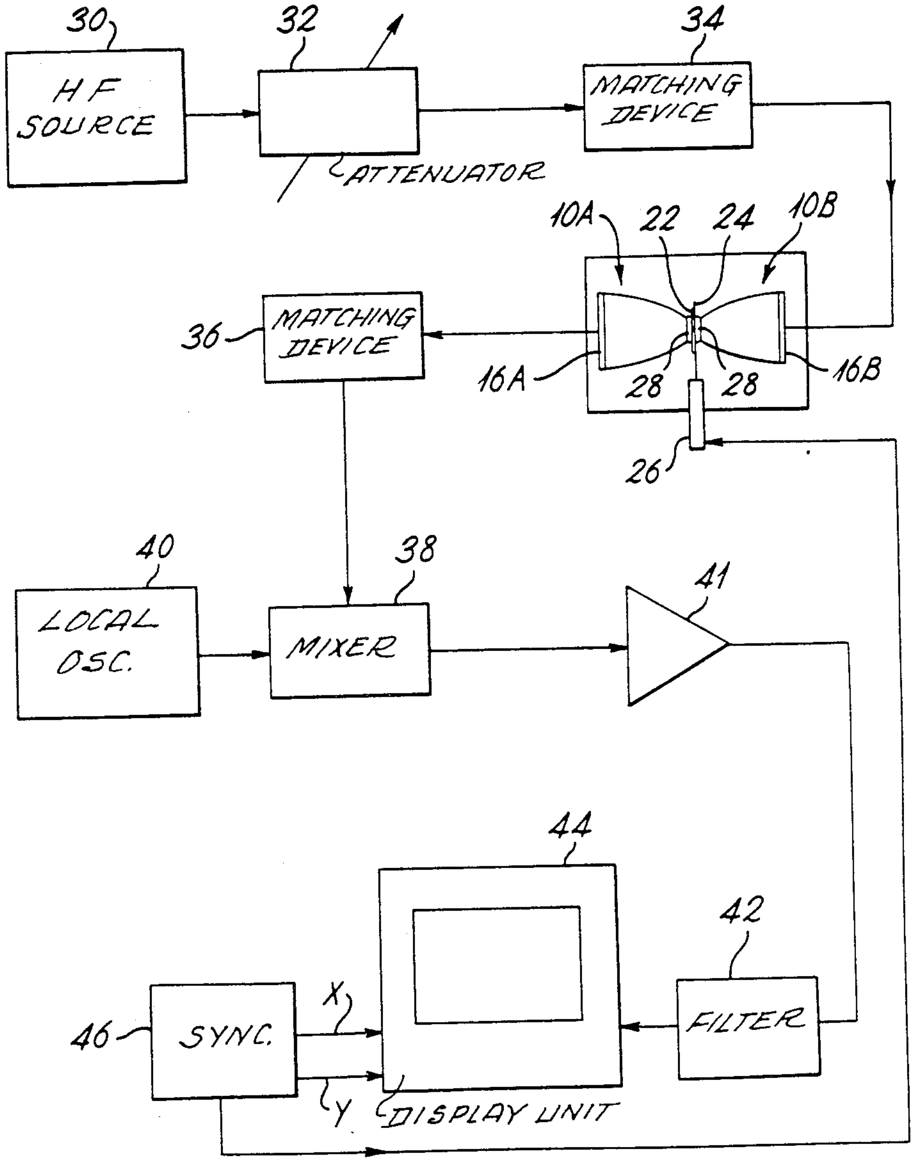
FIG. 2 illustrates schematically a scanning acoustic microscope.

FIG. 2 illustrates use of two acoustic lenses according to the invention in a scanning acoustic microscope. The two lenses 10A, 10B are arranged with their second endfaces adjacent and confocal. Between the second endfaces is a specimen to be investigated 22, attached to a thin support 24 carried by a scanning device 26 which scans the specimen 22 in two dimensions through the focus. The specimen 22 is coupled to the second endfaces of the lenses 10A, 10B, by drops of water 28.

The transducer 16B of the lens 10B is connected to a high frequency source 30 through a variable attenuator 32 and a first stub tuner matching device 34. The transducer 16A of the lens 10A is connected through a second stub tuner matching device 36 to a first input of a mixer 38. The second input of the mixer is connected to a local oscillator 40 operating at a frequency which differs slightly from the oscillator 30. The mixer output is connected through an amplifier 41 and a variable band pass filter 42 to a storage cathode ray display unit 44. The unit 44 is also connected to a scan synchronisation unit 46 which controls the scanning device 26.

In operation, the high frequency signal from the oscillator 30 is converted to acoustic radiation by the transducer 16B, and focused by the body of the lens 10B. Radiation transmitted by the specimen 22 is recollimated by the body of the lens 10A, converted to an electrical signal by the transducer 16A, and mixed with the signal from the local oscillator 40. The frequency is supplied as the intensity signal to the storage and display unit 44. The scan synchronisation unit 46 supplies x and y scan signals both to the unit 44 and to the scanning device 26. As the specimen 22 is scanned in the focal plane of the lens 10A, 10B, an intensity signal corresponding to each point is stored by the unit, and a point-by-point image is built up and displayed.

The arrangement illustrated in FIG. 2 is a transmission scanning acoustic microscope. It is also possible to use only one acoustic lens, plus a time-gating arrangement, to give a scanning acoustic microscope operable in a reflection mode. Either type of arrangement can be used in a C-scan mode, in which the specimen is scanned in the focal plane, and the focus is a known depth below the specimen surface, or in a B-scan mode, in which axial scanning within the specimen is achieved by time gating; this is possible because of the long depth of focus.

If a split transducer is provided, as described by Smith and Wickramasinghe in Electronics Letters, 18 (2), 1982 pages 92 to 94, a Doppler shift is provided which could be used to study flow in blood vessels.

Figure 3:
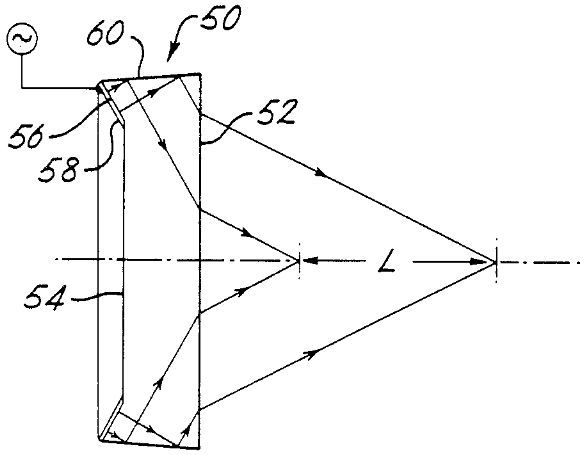
FIG. 3 is a section through a second embodiment of an acoustic lens.

An alternative embodiment of an acoustic lens is illustrated in FIG. 3. The lens 50 has the general form of a short truncated cone. The second endface 52 is plane and perpendicular to the conical axis, and the first endface has a central, inoperative area 54 which is parallel to the second endface, and an outer operative area 56 frusto-conical form, the endface being generally concave. An annular piezoelectric transducer 58 contacts the operative area 56. Between the endfaces is a conical lens wall 60, its cone apex angle lying beyond the first endface. When the transducer 58 generates effectively a plane wave of acoustic radiation, i.e. a wave having a radius of curvature much longer than the wave length, so that plane wave theory can be applied, the wave is reflected internally at the conical lens wall 60 and refracted through the second endface 52. In this embodiment, the focus is a line focus L having considerable axial depth so that it is essential to use the technique of time gating. The main lobe is almost the same width along the whole length of the line focus, and it is easier to achieve a good focus by altering the time gating than by physical relative movement of the object and the focus.

The angles with respect to the central axis of the frusto-conical operative area 56 and of the reflecting lens wall 60 are chosen so that a large shear component is generated as the acoustic wave is internally reflected, which couples into the coupling fluid in contact with the second endface 52 as a longitudinal wave. Preferably the coupling occurs as close as possible to the shear critical angle, and in general the angle of transmission of the acoustic wave should be as large as possible, so that the focal line is as narrow as possible, and also the amplitude of transmission at the design angle should be maximal.

Figure 4:
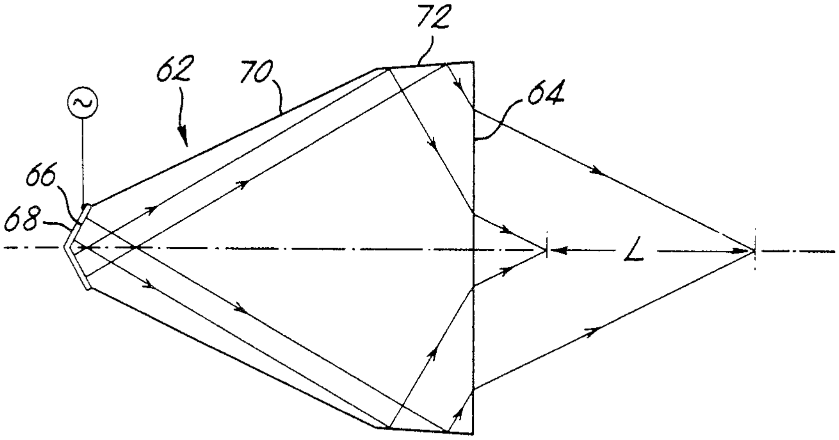
FIG. 4 is a section through a third embodiment of an acoustic lens.

In the third embodiment illustrated in FIG. 4, the lens 62 is of generally conical form. The second endface 64 is plane and perpendicular to the conical convex axis, the first endface 66 is conical, is much smaller in area than the second endface, and carries a transducer 68. The lens wall between the endfaces has two distinct areas; the area 70 adjacent the first endface 66 is frusto-conical and has a smaller cone angle than the cone angle of the first endface. The area 72 adjacent the second endface is of even smaller cone angle and of shorter axial length than the first area 70. In this arrangement the effectively plane waves generated by the transducer 68 cross the axis of the cone to be reflected by the area 72 through the second endface 64 to a line focus L.

The advantages of the third embodiment of the lens are that it is now entirely convex in shape, and small convex lenses are easier to make than small lenses having a concave surface, and the transducer 68 is at a considerable distance from the reflecting wall area 72, so that any problem of internal reverberations is minimised.

A great advantage of an acoustic lens according to the invention is that the layer of liquid which couples the second endface to the specimen under investigation can be very thin, and can be the minimum thickness required to couple the radiation so that path length in the liquid is very short, much shorter than is possible with a concave-face sapphire lens. It is therefore possible to use the lens at higher frequencies than the 50 MHz to 1 GHz of known scanning acoustic microscopes, because the higher attenuation at the higher frequency is tolerable, and higher resolution is available. It is of course essential that the curved wall 20 of the lens conforms very accurately to the required shape.

In addition to the use of higher frequencies, a lens according to the invention has the further advantage of allowing the use of shear waves in scanning acoustic microscopy. Shear waves are not supported by the low viscosity liquids such as water commonly used as coupling liquids, and are supported only in liquids having much higher viscosity, such as honey or silicone oil. But higher viscosity liquids are highly attenuating to acoustic radiation, and with the substantial path lengths in liquid in conventional, concave-faced acoustic lenses, use of shear waves was very difficult. However, the use of a thin layer of viscous coupling liquid in conjunction with an acoustic lens according to the invention is tolerable. A major advantage is that the velocity of a shear wave is approximately half the velocity of a longitudinal wave, so that the theoretical resolution is doubled. Another advantage is that shear waves can be used in a direct study of anisotropy, such as that of crystals within materials, and the disposition of different stereoisomers of a high polymeric material within a spherulite.

The lens will usually be of circular cross-section perpendicular to the axis A, but the lens may also be of square or other cross-section.

A lens according to the invention may be made of the materials conventional in scanning acoustic microscopy, such as fused quartz or sapphire. In such a material, the velocity of sound is high, and usually the lens will be used to provide an acoustic image of a material having a similarly high acoustic velocity, such as investigation of an integrated circuit, or for crack detection in metals. Alternatively, the lens may be made of a high polymeric material such as polyethylene or polymethylmethacrylate, in which the velocity of sound is low, but which provide a good impedance match to water, the most frequently used coupling liquid.

I claim:

1. Apparatus for focussing or collimating a beam of high frequency acoustic radiation comprising a solid body of material capable of transmitting acoustic radiation, having a first surface with an electroacoustic transducer coupled thereto to generate acoustic radiation therein, a second surface remote from said first surface for propagation of acoustic radiation between said body and an acoustic transmission medium in contact with said surface and a third internally-reflecting surface cooperable with said first surface to focus said acoustic radiation externally to said body and beyond said second surface.

2. Apparatus for focussing or collimating a beam of acoustic radiation as claimed in claim 1 wherein said electro-acoustic transducer is adapted to generate acoustic radiation.

3. Apparatus for focussing or collimating a beam of acoustic radiation as claimed in claim 1 wherein said electro-acoustic transducer is adapted to receive acoustic radiation.

4. Apparatus for focussing or collimating a beam of acoustic radiation as claimed in claim 1 wherein said first surface is substantially plane and parallel to said second surface and said third surface is substantially parabaloid.

5. Apparatus for focussing or collimating a beam of acoustic radiation as claimed in any one of claim 1 wherein said first surface is concave and has an outer annulus of frusto-conical form and said third surface is also frusto-conical.

6. Apparatus for focussing or collimating a beam of acoustic radiation as claimed in claim 1 wherein said first surface is convex and of smaller area than the second surface and said third surface is frusto-conical.

7. Apparatus for focussing or collimating a beam of acoustic radiation as claimed in claim 1 wherein said material is aluminium.

8. Apparatus as claimed in claim 1 wherein said material is sapphire.

9. Apparatus as claimed in claim 1 wherein said material is quartz.

10. Apparatus as claimed in claim 1 wherein said material is a high polymeric plastics material.

11. A scanning acoustic microscope including apparatus for focussing or collimating a beam of acoustic radiation as claimed in claim 1.

12. A transmission-mode scanning acoustic microscope as claimed in claim 11 incorporating a first device for generating and focussing a beam of acoustic radition and a second device for collimating a receiving said beam.

13. A reflection-mode scanning acoustic microscope as claimed in claim 11 incorporating a common device for generating a focussing beam of acoustic radiation and also for collimating and receiving said beam.

* * * * *